(12) United States Patent
Hoellriegl et al.

(10) Patent No.: US 9,056,724 B2
(45) Date of Patent: Jun. 16, 2015

(54) APPARATUS FOR HANDLING CONTAINERS

(71) Applicant: KRONES AG, Regensburg (DE)

(72) Inventors: Thomas Hoellriegl, Teublitz (DE);
Florian Geltinger, Donaustauf (DE);
Thomas Spitzer, Wiesent (DE)

(73) Assignee: KRONES, AG, Neutraubling (DE)

( * ) Notice: Subject to any disclaimer, the term of this patent is extended or adjusted under 35 U.S.C. 154(b) by 0 days.

(21) Appl. No.: 14/195,960

(22) Filed: Mar. 4, 2014

(65) Prior Publication Data

US 2014/0251754 A1 Sep. 11, 2014

(30) Foreign Application Priority Data

Mar. 11, 2013 (DE) .................. 20 2013 101 048 U

(51) Int. Cl.
| | |
|---|---|
| B65G 29/00 | (2006.01) |
| B29C 49/28 | (2006.01) |
| B29C 49/46 | (2006.01) |
| B67C 3/24 | (2006.01) |
| B65G 47/86 | (2006.01) |
| B29C 49/42 | (2006.01) |
| B29C 49/06 | (2006.01) |
| B29C 49/36 | (2006.01) |

(Continued)

(52) U.S. Cl.
CPC ............... *B65G 29/00* (2013.01); *B29C 49/28* (2013.01); *B29C 49/42* (2013.01); *B29C 49/46* (2013.01); *B67C 3/242* (2013.01); *B65G 47/847* (2013.01); *B29C 49/06* (2013.01); *B29C 49/36* (2013.01); *B29C 2049/4697* (2013.01); *F16H 53/025* (2013.01); *F16H 53/06* (2013.01)

(58) Field of Classification Search
CPC ............... B65G 47/847; B65G 47/846; B65G 2201/0244; B65G 29/00; B65G 2811/0636; B65G 21/2072
USPC .......... 198/470.1, 474.1, 480.1, 481.1, 478.1; 193/37
See application file for complete search history.

(56) References Cited

U.S. PATENT DOCUMENTS 2,713,960 A * 7/1955 Siegal ........................ 198/481.1
4,484,525 A 11/1984 Forshee et al.

(Continued)

FOREIGN PATENT DOCUMENTS

DE 102007050582 4/2009
EP 2388129 11/2011

(Continued)

OTHER PUBLICATIONS

Extended European Search Report dated Aug. 4, 2014 issued in corresponding European Application No. 14158064.7.

*Primary Examiner* — James R Bidwell
(74) *Attorney, Agent, or Firm* — Onello & Mello, LLP.

(57) ABSTRACT

Provided is an apparatus for handling containers. The apparatus comprises a moveable carrier, a plurality of treatment stations arranged on the moveable carrier for treating the containers, each treatment station having at least one element that is moveable in relation to the carrier, and a stationary guide curve. The elements are temporarily coupled to the guide curve. A movement between a treatment station of the plurality of treatment stations and the guide curve translates to a movement of the at least one element. A coupling device comprises at least one guide roller which at least temporarily contacts the guide curve. At least one of the guide roller or the guide curve includes an imidized polymer material.

20 Claims, 3 Drawing Sheets

(51) Int. Cl.
*F16H 53/02* (2006.01)
*F16H 53/06* (2006.01)

(56) References Cited

U.S. PATENT DOCUMENTS

| | | | | |
|---|---|---|---|---|
| 5,082,105 | A * | 1/1992 | Tincati | 198/473.1 |
| 5,533,608 | A * | 7/1996 | Adams et al. | 198/478.1 |
| 8,267,242 | B2 * | 9/2012 | Kim et al. | 198/844.2 |
| 8,342,316 | B2 * | 1/2013 | Zoppas et al. | 198/480.1 |
| 8,418,836 | B2 * | 4/2013 | Papsdorf | 198/480.1 |
| 8,561,783 | B2 * | 10/2013 | McAllister et al. | 198/473.1 |
| 8,956,149 | B2 * | 2/2015 | Zacche | 198/470.1 |

FOREIGN PATENT DOCUMENTS

| | | |
|---|---|---|
| EP | 2540473 | 1/2013 |
| WO | WO01/38204 | 5/2001 |

\* cited by examiner

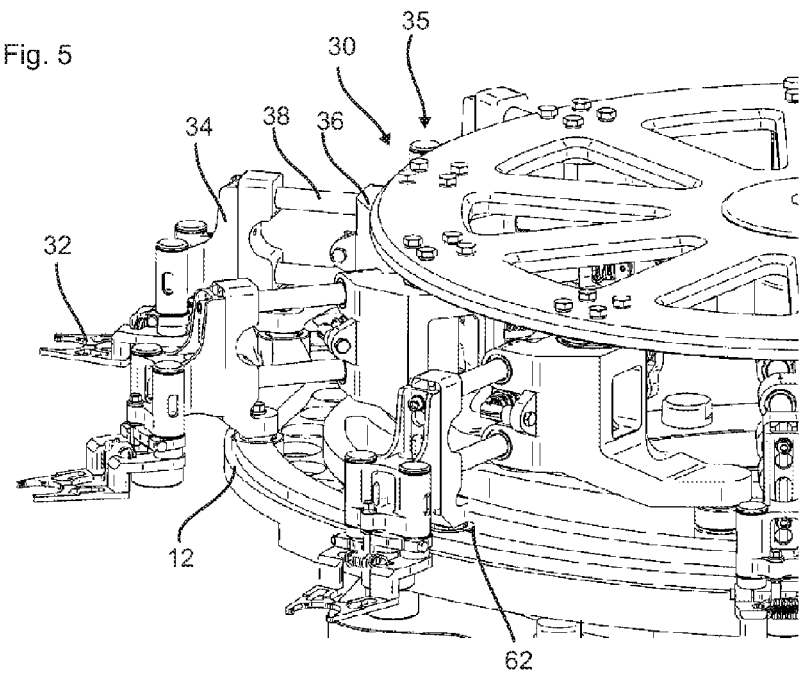
Fig. 5
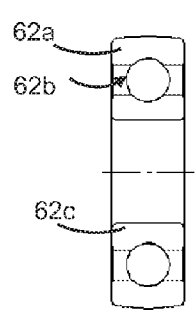
Fig. 6a
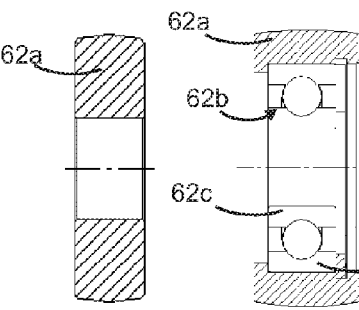
Fig. 6b  Fig. 6c
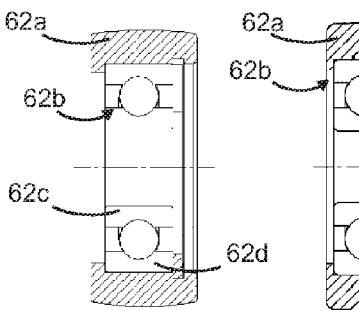
Fig. 6d
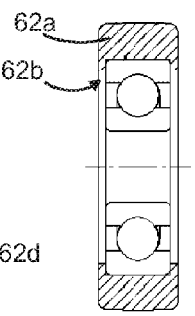
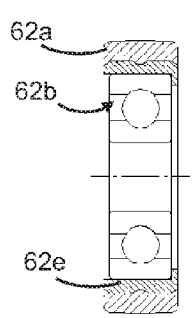
Fig. 6e
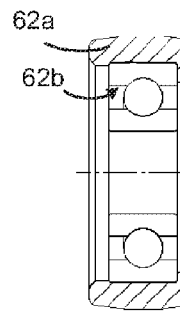
Fig. 6f
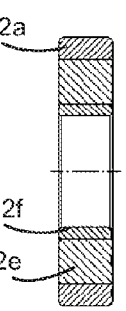
Fig. 6g

APPARATUS FOR HANDLING CONTAINERS

BACKGROUND

1. Technical Field

The present inventive concepts relate to an apparatus for handling containers, and in particular an apparatus for handling plastic containers having plastic guide rollers.

2. Description of the Related Art

Container-handling appliances are well-known, for example, ovens for heating plastic preforms, devices for forming plastic preforms into plastic containers, filling devices, labelling machines, and so on. These appliances handle containers in a predefined manner, for example, in that they form plastic preforms into plastic containers or the like. Often, elements of such treatment units are moved during transport of the containers. For example, molding shells or mold shell carriers of a blow molding machine are moved towards each other to form a cavity within which the plastic containers are produced.

Many conventional appliances have so-called guide curves which are normally arranged to be stationary and along which curve rollers roll, wherein this rolling causes the corresponding movement of the treatment units. Normally, the curve rollers are made of steel. However, steel rollers must be lubricated with grease leading to very rapid wear and tear. Therefore, steel guide curves must be hardened to ensure an adequate service life. In addition, on lubrication the excess grease is sprayed out by the ever faster-rotating curve rollers, partly due to power increases. This is unsuitable however for aseptic applications in particular.

SUMMARY

According to an aspect of the present inventive concept, provided is an apparatus for handling containers, comprising a moveable carrier; a plurality of treatment stations arranged on the moveable carrier for treating the containers, wherein each of the treatment stations has at least one element that is moveable in relation to the carrier; a stationary guide curve, the at least one element at least temporarily coupled to the guide curve, wherein a movement between a treatment station of the plurality of treatment stations and the guide curve translates to a movement of the at least one element; and a coupling device comprising at least one guide roller which temporarily rolls against the guide curve. At least one of the guide roller or the guide curve includes an imidized polymer material.

In some embodiments, the apparatus further comprises a clean room, wherein the containers are transported in the clean room during a treatment of the containers by the treatment stations.

In some embodiments, the transport stations transport the containers along a transport path in the clean room, and wherein the clean room surrounds the transport path of the containers.

In some embodiments, the clean room has at least one movable first wall and a stationary second wall that delimits the clean room. A movement of the first wall is determined by a movement of the carrier.

In some embodiments, the imidized polymer material includes at least one of polyamide-imide (PAI), polyimide (PI), or polybenzinimidazol (PBI).

In some embodiments, at least one surface of the guide roller contacts the guide curve, and comprises polyamide-imide.

In some embodiments, the guide roller is formed of several pieces.

In some embodiments, the apparatus further comprises a bearing device that is constructed and arranged to mount the guide roller on the roller carrier.

In some embodiments, the guide roller is constructed and arranged at least in regions at the treatment station.

In some embodiments, the moveable carrier is rotatable about a predefined rotary axis.

In some embodiments, the guide roller is constructed and arranged as a slide roller.

In some embodiments, the guide roller comprises an annular body of polyamide-imide (PAI) which is arranged on a bearing device. In some embodiments, the annular body is snap-locked or pressed onto the bearing device.

In some embodiments, the guide roller has a bearing device, about which the polyamide-imide body is injection-molded.

In some embodiments, the guide roller has an outer diameter between 20 mm and 80 mm.

In some embodiments, the guide curve comprises a non-hardened material on a surface facing the guide roller.

In some embodiments, the guide roller moves against the guide curve without lubrication.

In some embodiments, the coupling device comprises at least two guide rollers arranged next to each other.

In some embodiments, a rotary axis of the guide roller is parallel to a rotary axis of the carrier or extends in a radial direction of the carrier.

In some embodiments, the apparatus is selected from a group of appliances which contains heating devices for heating plastic preforms, forming devices for forming plastic preforms into plastic containers, filling devices for filling containers, and closing devices for closing containers with closures.

In some embodiments, the treatment stations each have bombardment devices which bombard plastic preforms with a gaseous medium, wherein blow molding parts are moveable in relation to each other and form a cavity, within which the plastic preforms can be expanded by bombardment with the gaseous medium.

In some embodiments, the treatment stations each have a stretch rod body which is introduced into the plastic preforms for their expansion.

In some embodiments, the apparatus comprises several guide curves in order to move several moveable elements of the apparatus, and also several guide rollers.

In another aspect, provided is a clean room, comprising a movable first wall; a stationary second wall; a transport path between the first wall and the second wall; and a plurality of treatment stations arranged on a moveable carrier for transporting a plurality of containers along the transport path between the first wall and the second wall. Each of the treatment stations has at least one element that is moveable in relation to the carrier. A movement of the first wall is determined by a movement of the carrier; a stationary guide curve. The at least one element is at least temporarily coupled to the guide curve. A movement between a treatment station of the plurality of treatment stations and the guide curve translates to a movement of the at least one element. At least one guide roller at least temporarily contacts the guide curve. At least one of the at least one guide roller or the guide curve is arranged inside the clean room. At least one of the guide roller or the guide curve includes an imidized polymer material.

BRIEF DESCRIPTION OF THE DRAWINGS

The above and other aspects and features of the present inventive concept will become more apparent by describing in detail exemplary embodiments thereof with reference to the attached drawings, in which:

FIG. 5 is a further embodiment of an apparatus according to embodiments of the inventive concepts; and FIGS. 6a-g are depictions of a curve roller according to embodiments of the inventive concepts.

DETAILED DESCRIPTION OF THE EMBODIMENTS

Figure 1:
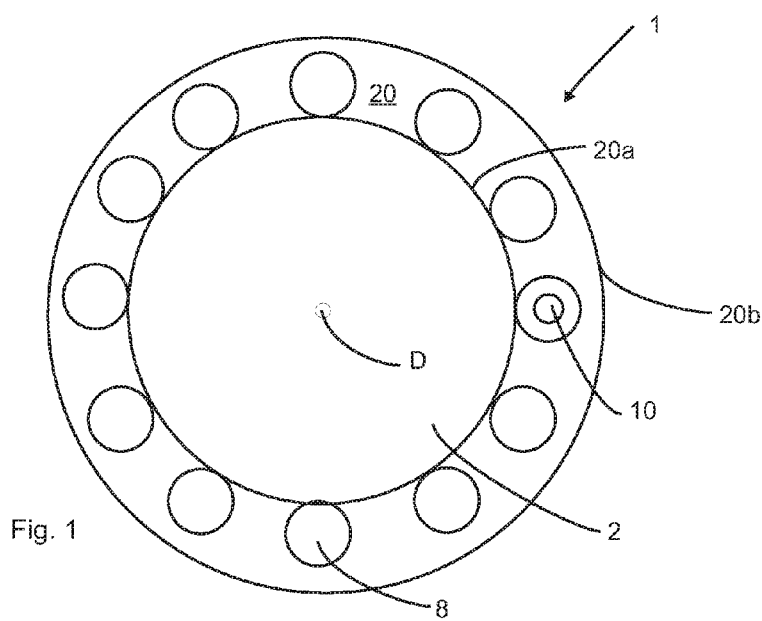
FIG. 1 is a diagrammatic depiction to illustrate an apparatus according to embodiments of the inventive concepts.

Advantages and features of the present inventive concepts and methods of accomplishing the same may be understood more readily by reference to the following detailed description of preferred embodiments and the accompanying drawings. The present inventive concepts may, however, be embodied in many different forms and should not be construed as being limited to the embodiments set forth herein. Rather, these embodiments are provided so that this disclosure will be thorough and complete and will fully convey the concept of the inventive concepts to those skilled in the art, and the present inventive concepts will only be defined by the appended claims. In the drawings, the thickness of layers and regions are exaggerated for clarity.

It will be understood that when an element or layer is referred to as being "on" or "connected to" another element or layer, it can be directly on or connected to the other element or layer or intervening elements or layers may be present. In contrast, when an element is referred to as being "directly on" or "directly connected to" another element or layer, there are no intervening elements or layers present. Like numbers refer to like elements throughout. As used herein, the term "and/or" includes any and all combinations of one or more of the associated listed items.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The use of the terms "a" and "an" and "the" and similar referents in the context of describing the inventive concepts (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted.

It will be understood that, although the terms first, second, etc. may be used herein to describe various elements, these elements should not be limited by these terms. These terms are only used to distinguish one element from another element. Thus, for example, a first element, a first component or a first section discussed below could be termed a second element, a second component or a second section without departing from the teachings of the present inventive concepts.

The present inventive concepts are based on an object of providing a device for handling containers, wherein the degree of contamination can be reduced in relation to machines known from the prior art. A further object is to reduce the wear of such machines. These objects are achieved according to the inventive concepts by the subjects of the independent claims. Advantageous embodiments and refinements are the subject of the subclaims.

An apparatus according to the inventive concepts for handling containers has a moveable carrier on which a plurality of treatment stations is arranged for treating the containers, wherein preferably each of these treatment stations treats the containers in a predefined manner.

Furthermore, each of these treatment stations has at least one element which is moveable in relation to the carrier, and this moveable element is coupled for at least part of the time to a stationarily arranged guide curve by means of a coupling device, such that the relative movement between the treatment station and the guide curve causes a movement of the moveable element.

According to the present inventive concepts, the coupling device has at least one guide roller which rolls on the guide curve for at least part of the time, wherein this guide roller and/or the guide curve at least partly comprise an imidized plastic.

It is therefore proposed that the steel rollers previously used and/or the material of the guide curve be made from an imidized plastic, for example, contain PI (polyimide), PBI (polybenzinimidazol) and similar, and/or combinations of these plastics, and/or other imidized polymer materials.

The use of such a plastic entails great advantages. Thus on the use of such polyamide-imide rollers, no hardening is required of the guide curves, such as for example the main curves, central curves, locking and unlocking curves, floor-steering curve segments, heating mandrel curves and similar. Also the lubrication required in the prior art can be omitted. Thus, the wear is lower in comparison with other conceivable plastics and hence also the service life is substantially longer. The plastic described here is suitable in particular for aseptic application areas.

In addition, as a material for the guide curve and/or guide roller, PEEK (polyetherketone) could be used. PEEK preferably contains reinforcement fibres. Such a material is particularly suitable for a slow running rate.

Here it is advantageous to make at least one of the two contacting elements i.e. the guide roller and/or the guide curve, from this imidized plastic. Reference is made below to polyamide-imide as representative of such imidized plastics, but it is pointed out that the imidized plastic can be selected from a group of plastics which contain PI (polyimide), PBI (polybenzinimidazol) and similar, and/or combinations of these plastics.

At least one of the two bodies, which come into contact with each other in order to provoke the movement, is an imidized plastic (generally preferably reinforced).

In this preferred embodiment, the apparatus is part of a clean room within which the containers are transported during treatment by the treatment stations. It is known from the prior art that the production of certain beverages, for example iced tea, requires a high degree of cleanliness. To this end therefore, clean rooms are usually provided within which the plastic containers can be treated, for example plastic preforms can be formed into plastic containers.

Advantageously, the clean room surrounds a transport path for the containers as a channel. In this way the volume of the clean room (which must be kept sterile) can be kept very small. Thus for example it is possible that said carriers, on which the treatment stations are arranged, can form a wall of the clean room.

In a further advantageous embodiment, the clean room has at least one first wall delimiting the clean room, the movement of which is coupled to a movement of the carrier, and a second in particular stationary wall which also delimits the clean room. Here preferably also a sealing device may be provided which seals said walls moving in relation to each other. Thus, for example, a so-called water lock can be provided. This water lock comprises a peripheral channel filled with a fluid and preferably arranged stationarily, in which part of the moving wall element is immersed, so that firstly a relative movement is possible but secondly the clean room is delimited from the environment.

In a further advantageous embodiment, at least one surface of the guide roller contacting the guide curve is made from a polyamide-imide. In some embodiments, the guide roller is made completely from this material. It is preferable that the surface in contact with the guide curve is made from polyamide-imide. It is also possible for the surface of the guide curve in contact with the guide roller to consist of an imidized plastic and for example polyamide-imide. In this case, a conventional steel roller could also be used as a guide roller. It would however be also possible for both the guide curve and the guide roller to be made of an imidized plastic.

In a further advantageous embodiment, the guide roller is formed in several pieces. Thus it can for example be possible for the guide roller to be mounted on a roller carrier by means of a bearing device, and for example the material of the bearing device and the surface of the guide roller to be different.

In a further advantageous embodiment, the guide roller is arranged at a treatment station or at the treatment station.

In a further advantageous embodiment, the movable body is a carrier rotatable about a predefined rotary axis. Here, it is conceivable for the individual treatment devices to be arranged on an outer periphery or outer region of this rotatable carrier. If the apparatus is for example a blow molding machine, the individual blow molding stations are preferably attached to the outer region of this carrier.

In a further advantageous embodiment, the guide roller is formed as a slide roller. Thus it is possible for the guide roller to be formed without an integrated bearing.

In a further advantageous embodiment, the guide roller comprises an annular body of polyamide-imide which is applied to a bearing device. The annular body can be snap-locked or pressed onto said bearing device. In a further embodiment it is conceivable for the guide roller to comprise a bearing device around which a polyamide-imide body is injection-molded. This embodiment is particularly simple to produce. Preferably the guide roller can consist substantially completely of a polyamide-imide plastic.

In a further advantageous embodiment, the guide roller has an outer diameter which is between 20 mm and 80 mm, preferably between 25 mm and 70 mm, and particularly preferably between 30 mm and 60 mm. These diameters have proved particularly advantageous, in particular in connection with the polyamide-imide material used here.

In a further advantageous embodiment, the guide curve comprises a non-hardened material on one surface facing the guide roller. In the prior art, in particular on the use of steel rollers, it is normal also for the guide curves themselves to be hardened. Here it is now proposed that the guide curves themselves are no longer hardened, which is advantageous in particular in connection with the polyamide-imide plastic used.

A further advantage of the guide roller used here is the high impact resistance. This is because the material used to form the guide roller has a high strength.

In a further advantageous embodiment, the guide roller moves on the guide curve without lubrication. This means that no lubricants are required to lubricate the movement of the guide roller against the guide curve. This is advantageous in particular for aseptic applications, since then no contamination from said lubricants can occur. In a preferred embodiment, a guide curve can be arranged for example outside a clean room and the guide roller can also be arranged outside the clean room, and a coupling device can extend through a wall delimiting the clean room, wherein preferably this movement which is transmitted into the clean room can also be sealed, for example, by the use of gaiters or the like.

In a further advantageous embodiment, the coupling device comprises at least two guide rollers arranged next to each other. By the use of several guide rollers, a more balanced movement is possible. Advantageously, these two guide rollers, which are arranged next to each other are spaced from each other. The guide rollers can each comprise a polyamide-imide material at least on their outer periphery. Advantageously, precisely two guide rollers are provided arranged next to each other i.e., in the form of a double roller. Preferably the first guide roller provokes a first movement of the treatment station and the further guide roller provokes another but different movement, such as a movement in an opposite direction.

In a further advantageous embodiment, a rotary axis of the guide roller runs parallel to a rotary axis of the carrier.

It would however be also conceivable and preferred for a rotary axis of the guide roller to run in a radial direction of the carrier. This is advantageous in particular for upward and downward movements of elements within the clean room, since movements can be generated in this direction, for example, a vertical direction, with a guide roller.

Advantageously, the apparatus is selected from a group of appliances which comprise heating devices for heating plastic preforms, forming devices for forming plastic preforms into plastic containers, filling devices for filling containers, closing devices for closing containers with closures, or the like. With such machines, the use of such guide curves is advantageous and in some cases relatively high forces must be transmitted. For this reason, the rollers with polyamide-imide material described here are particularly suitable for such machines.

In a further advantageous embodiment, the treatment stations each have bombardment devices which bombard the plastic preforms with a gaseous medium, such as blow molding parts, which are moveable in relation to each other and in one state form a cavity, within which the plastic preforms can be expanded by bombardment with the gaseous medium. Here, the treatment stations are treatment stations of a blow molding machine. Here it is conceivable that the individual parts of the blow molding machine, for example, the blow mold carrier, blow nozzles and similar, but also any locking mechanisms, can be controlled by guide curves and the guide rollers described herein.

In a further advantageous embodiment, the treatment stations each have a stretch rod body which can be introduced into the plastic preforms for their expansion. In this embodiment, the plastic preforms are also stretched by means of the stretch rod during their expansion. The stretch rod movement can here be generated by guide curves, and in particular the guide rollers described here can be used.

In a preferred embodiment, at least one of the movements described is initiated by a guide curve and a guide roller described here. Advantageously, as described above, the guide curve can be situated outside a clean room.

In a further advantageous embodiment, the apparatus comprises several guide curves in order to move several moveable elements of the apparatus, wherein several guide rollers, in particular guide rollers of the type described here, are provided with a polyamide-imide material.

In a further advantageous embodiment, the polyamide-imide material used here is a fibre-reinforced material, i.e. reinforcement fibres, which can be introduced at the guide roller.

In a further advantageous embodiment, at least one guide roller and/or at least one guide curve is arranged inside the clean room mentioned above.

FIG. 1 shows an apparatus 1 according to the inventive concepts for handling plastic containers 10. The apparatus has a carrier 2 which can rotate above an axis D. A plurality of treatment stations 8 is arranged at the outer periphery of this carrier. When the carrier 2 rotates, the transport stations 8 are transported along a circular path. During this transport, different treatment processes are performed such as for example, in the case of a blow molding machine, opening and closing of the respective blow mold carriers with blow mold parts arranged thereon.

The plastic containers 10 are transported in a clean room or sterile room 20. The clean room 20 is delimited by a first moving wall 20a and a second stationary wall 20b. The guide curves, not shown in FIG. 1, can be arranged outside the clean room and movement-transmitting means can be provided which extend through a wall of the clean room 20. The guide rollers also move outside the clean room. Because of the procedure according to the inventive concepts described here, in which no lubricant is required, it is however preferred for both the guide curves and the guide rollers to be arranged inside the clean room, whereby complex transitions through the walls of the clean room can be avoided.

Figure 2:
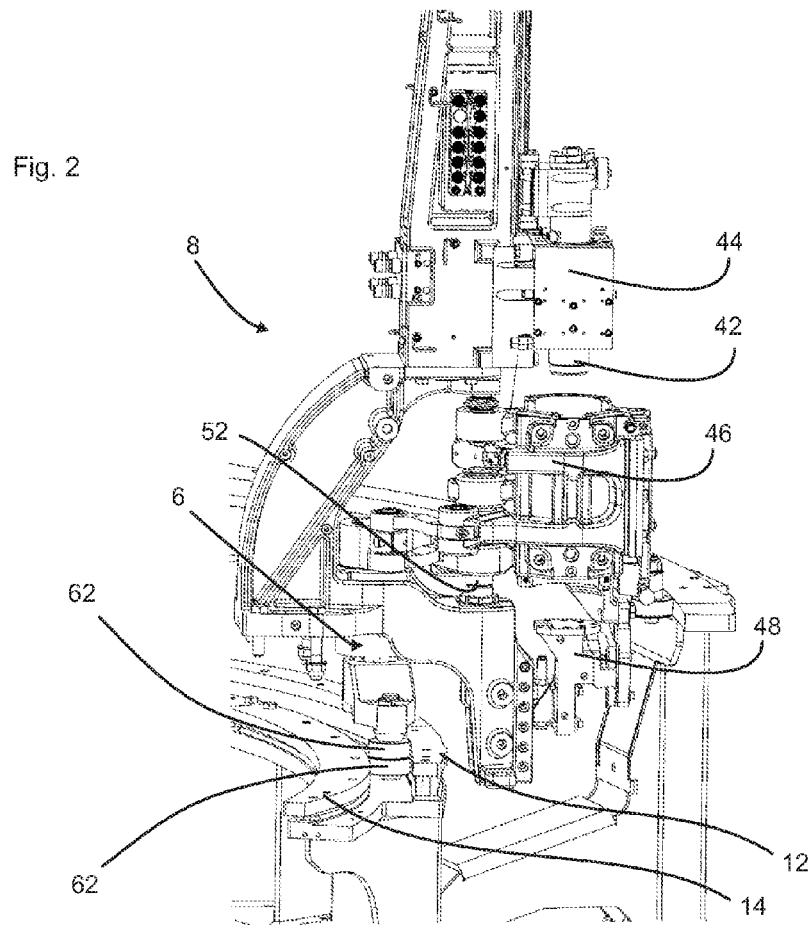
FIG. 2 is a depiction of an apparatus for forming plastic preforms into plastic containers with a curve roller according to embodiments of the inventive concepts.

FIG. 2 shows a more detailed depiction of an apparatus according to the inventive concepts for forming plastic preforms into plastic containers. This apparatus, as stated above, has a treatment station 8. The treatment station 8 comprises one or more lateral blow mold carriers 46 and a base part 48. To close the blow mold, the two blow mold carriers are brought together and the bottom part 48 is brought from underneath up to the blow mold in order to close the blow mold completely. Then the plastic preforms are bombarded with blowing pressure via a blowing nozzle 42. A valve block 44 controls the bombardment of the plastic preforms with blowing air, in particular under different pressure levels.

In order for example to achieve the pivot movement of the blow mold carriers 46, two curve rollers 62 are provided. The curve rollers 62 roll against two stationary guide curves 12 and 14. For example, one of the two guide curves can close the blow mold and the other guide curve can open the blow mold.

Figure 3:
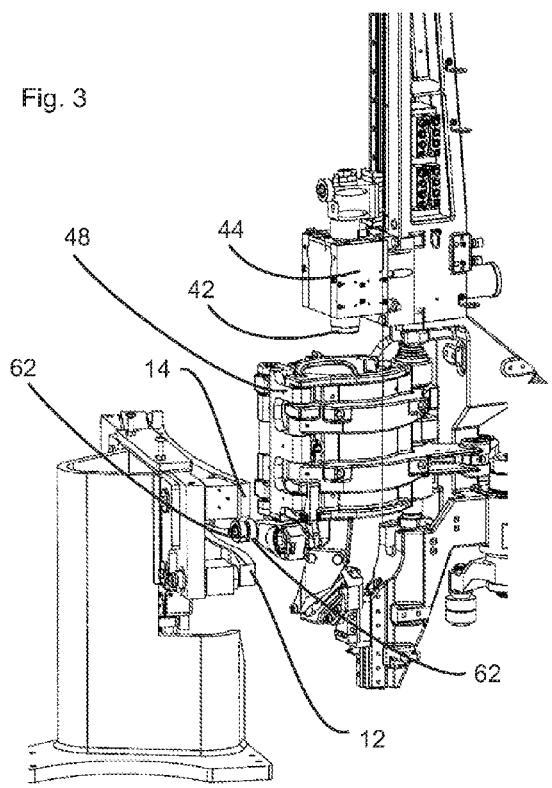
FIG. 3 is a further depiction of an apparatus for forming plastic preforms into plastic containers.

FIG. 3 shows a further view of an apparatus according to the inventive concepts. In this embodiment, guide rollers 62 are provided which can move in a vertical direction, and again, by rolling against stationary guide curves 12 and 14, which in an embodiment are not offset laterally but are instead arranged below and above the guide rollers 62. With this movement, the locking element on which the guide rollers are arranged can execute a pivot movement which achieves a locking or unlocking of the blow mold carrier 46. Furthermore, guide rollers 62 can also be arranged at the blow molding station which can ensure the lifting or lowering of the bottom part of the blow mold.

Figure 4:
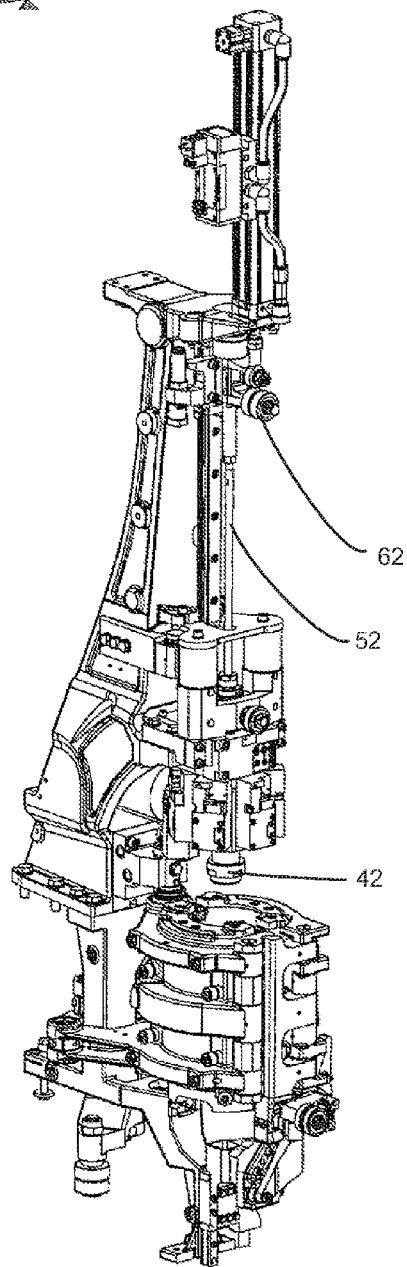
FIG. 4 is a further depiction of an apparatus according to embodiments of the inventive concepts.

FIG. 4 shows a further embodiment of an apparatus according to the inventive concepts. A guide roller 62 is provided which is coupled with a stretch rod 52. Here, the movement of the guide roller 62 along a defined curve, in particular in the vertical direction, achieves the movement of the stretch rod, wherein the stretch rod 52 in particular serves to stretch the plastic preform in its longitudinal direction during its expansion.

FIG. 5 shows a further possible apparatus 30 for handling containers, in which the inventive concepts can be used. More precisely, the embodiment shown in FIG. 5 is a transport device 30 for transporting containers. The transport device 30 has a rotatable carrier 35 on which a plurality of holding elements 32 is arranged for holding the containers. The holding elements 32 are configured as gripper clamps, which can grip the containers below their carrier ring. In the embodiment shown here, the holding elements can be pivoted in relation to the carrier 35 so that a pitch delay between the individual containers can be set.

A fixing element 36 is arranged, preferably moveably, in particular pivotably, on the carrier 35. This pivoting can also be achieved by means of the guide rollers described above. A plurality of carriers 34 is attached to this fixing element 36 via connecting bodies 38, and the holding elements 32 in turn are arranged thereon.

In addition, a guide curve 12 is provided, against which the guide roller 62 can roll. This rolling movement achieves a defined movement or pivoting of the holding elements in relation to the carrier 35.

FIGS. 6a-6g show depictions of guide rollers. FIG. 6a shows a conventional guide roller. This guide roller has a roller surface 62a which rolls against a guide curve. In addition, this guide roller comprises a bearing device 62b such as a deep groove ball bearing.

FIG. 6b shows an embodiment of a guide roller according to the inventive concepts. Here, the guide roller is designed integrally and comprises a rotatable roller body 62a.

FIG. 6c shows a further embodiment of a guide roller 62. In this embodiment, as well as the rotatable roller body 62a and bearing device 62b, a locking ring 62d is provided. The bearing device 62b can include an inner ring 62c.

FIG. 6d shows a further embodiment of the guide roller. This embodiment is an injection-molded design in which the roller body 62a is injection-molded around the bearing device 6b. The bearing device in the embodiment shown need not consist of plastics since it is not itself in contact with the guide curve.

In general however it would be conceivable for further elements of the guide rollers, such as the bearing device, the locking ring or any plain bearing, to be made of an imidized plastic. This can also increase the life expectancy of such a guide roller.

FIG. 6e shows a further embodiment of a curve roller according to the inventive concepts. This is also an injection-molded design, in which a roller ring 62e is provided. FIG. 6f shows a pressed or snap-locked embodiment of a guide roller. It is evident that a radially inwardly protruding portion is arranged on the roller body 62a which serves to snap-lock onto the other regions of the guide roller 62.

FIG. 6g shows a further embodiment of the guide roller which is here designed with a plain bearing 62f and a roller ring 62b. These two elements again need not necessarily be made of an imidized plastic. However, the roller body 62 is advantageously made of such a plastic.

In general, the imidized plastics described here and in particular PAI can be used in any sliding or rolling application, for example also in a slide guide in a linear bearing or linear bush, as shown for example in FIG. 5.

The applicant reserves the right to claim all features disclosed in the application documents as essential to the inventive concepts where novel individually or in combination in relation to the prior art.

What is claimed is:

1. An apparatus for handling containers, comprising:
    a moveable carrier;
    a plurality of treatment stations arranged on the moveable carrier for treating the containers, wherein each of the treatment stations has at least one element that is moveable in relation to the carrier;
    a stationary guide curve, the at least one element at least temporarily coupled to the guide curve, wherein a movement between a treatment station of the plurality of treatment stations and the guide curve translates to a movement of the at least one element; and
    a coupling device comprising at least one guide roller which at least temporarily contacts the guide curve, wherein at least one of the guide roller or the guide curve includes an imidized polymer material.

2. The apparatus according to claim 1, further comprising a clean room, wherein the containers are transported in the clean room during a treatment of the containers by the treatment stations.

3. The apparatus according to claim 2, wherein the transport stations transport the containers along a transport path in the clean room, and wherein the clean room surrounds the transport path of the containers.

4. The apparatus according to claim 2, wherein the clean room has at least one movable first wall and a stationary second wall that delimits the clean room, and wherein a movement of the first wall is determined by a movement of the carrier.

5. The apparatus according to claim 2, wherein at least one of the at least one guide roller and the guide curve is arranged inside the clean room.

6. The apparatus according to claim 1, wherein the imidized polymer material includes at least one of polyamide-imide (PAI), polyimide (PI), or polybenzinimidazol (PBI).

7. The apparatus according to claim 1, wherein at least one surface of the guide roller contacts the guide curve, and comprises polyamide-imide.

8. The apparatus according to claim 1, further comprising a bearing device that is constructed and arranged to mount the guide roller on the roller carrier.

9. The apparatus according to claim 1, wherein the guide roller is constructed and arranged at least in regions at the treatment station.

10. The apparatus according to claim 1, wherein the guide roller is constructed and arranged as a slide roller.

11. The apparatus according to claim 1, wherein the guide roller comprises an annular body of polyamide-imide (PAI) which is arranged on a bearing device.

12. The apparatus according to claim 10, wherein the annular body is snap-locked or pressed onto the bearing device.

13. The apparatus according to claim 1, wherein the guide roller has a bearing device, about which the polyamide-imide body is injection-molded.

14. The apparatus according to claim 1, wherein the guide curve comprises a non-hardened material on a surface facing the guide roller.

15. The apparatus according to claim 1, wherein the guide roller moves against the guide curve without lubrication.

16. The apparatus according to claim 1, wherein the coupling device comprises at least two guide rollers arranged next to each other.

17. The apparatus according to claim 1, wherein a rotary axis of the guide roller is parallel to a rotary axis of the carrier or extends in a radial direction of the carrier.

18. The apparatus according to claim 1, wherein the apparatus is selected from a group of appliances which contains heating devices for heating plastic preforms, forming devices for forming plastic preforms into plastic containers, filling devices for filling containers, and closing devices for closing containers with closures.

19. The apparatus according to claim 1, wherein the treatment stations each have bombardment devices which bombard plastic preforms with a gaseous medium, wherein blow molding parts are moveable in relation to each other and form a cavity, within which the plastic preforms can be expanded by bombardment with the gaseous medium.

20. A clean room, comprising:
    a movable first wall;
    a stationary second wall;
    a transport path between the first wall and the second wall;
    a plurality of treatment stations arranged on a moveable carrier for transporting a plurality of containers along the transport path between the first wall and the second wall, wherein each of the treatment stations has at least one element that is moveable in relation to the carrier, wherein a movement of the first wall is determined by a movement of the carrier;
    a stationary guide curve, the at least one element at least temporarily coupled to the guide curve, wherein a movement between a treatment station of the plurality of treatment stations and the guide curve translates to a movement of the at least one element; and
    at least one guide roller which at least temporarily contacts the guide curve, wherein at least one of the at least one guide roller or the guide curve is arranged inside the clean room, and wherein at least one of the guide roller or the guide curve includes an imidized polymer material.

* * * * *